United States Patent [19]

Lindner et al.

[11] Patent Number: 4,461,153
[45] Date of Patent: Jul. 24, 1984

[54] METHOD AND APPARATUS FOR INOCULATING CRYSTALLIZATION SEEDS INTO A LIQUID LATENT HEAT STORAGE SUBSTANCE

[75] Inventors: Friedrich Lindner, Stuttgart; Kurt Scheunemann, Lahr, both of Fed. Rep. of Germany

[73] Assignee: Deutsche Forschungs- und Versuchanstalt für Luft- und Raumfahrt e.V., Bonn, Fed. Rep. of Germany

[21] Appl. No.: 322,924

[22] Filed: Nov. 19, 1981

[30] Foreign Application Priority Data

Nov. 24, 1980 [DE] Fed. Rep. of Germany ....... 3044202

[51] Int. Cl.$^3$ .............................................. F25B 21/02
[52] U.S. Cl. .................................................... 62/3
[58] Field of Search ............................ 62/59, 324.1, 3

[56] References Cited

U.S. PATENT DOCUMENTS

| | | | |
|---|---|---|---|
| 2,095,008 | 10/1937 | Philipp | 62/59 |
| 2,677,243 | 5/1954 | Telkes | |
| 4,055,053 | 10/1977 | Elfving et al. | 62/3 |
| 4,086,958 | 5/1978 | Lindner et al. | 62/59 X |
| 4,091,863 | 5/1978 | Schroder | 62/59 X |
| 4,111,260 | 9/1978 | Bricard et al. | 62/59 X |
| 4,153,105 | 5/1979 | Schroder | 62/59 X |
| 4,192,146 | 3/1980 | Crede | 62/59 |
| 4,302,944 | 12/1981 | Gainer | 62/59 |

FOREIGN PATENT DOCUMENTS 2732320 1/1978 Fed. Rep. of Germany.
2753598 6/1979 Fed. Rep. of Germany.

OTHER PUBLICATIONS

Telkes, "Nucleation of Supersaturated Inorganic Salt Solutions", Industrial and Eng. Chem., vol. 44, No. 6, pp. 1308-1310.

*Primary Examiner*—Lloyd L. King
*Attorney, Agent, or Firm*—Laubscher, Philpitt & Laubscher

[57] ABSTRACT

A method and apparatus for inoculating a liquid latent heat storage substance of the type convertible to the solid state on cooling is disclosed. A portion of the substance is caused to crystallize on a cooled active surface, immersed in the substance and preferably vertically arranged, whereupon the active surface is heated to fuse-off the formed crystals to release them into the liquid portion of the storage substance to thus form inoculation seeds on which further crystallization of the storage substance takes place on withdrawal of heat from same. In one described embodiment, a pair of active surfaces is provided by using a Peltier element operating with a DC source having selectively reversible polarity whereby one surface is cooled down while the other is heated and vice versa, depending on the instant polarity of the DC source. In another embodiment, the active surface is alternately heated and cooled by heat carrier medium of a heat pump circulation system drawn from the respective sections of the system in alternating fashion. Due to the formation of crystallization seeds from the heat storage substance, problems normally associated with the use of a foreign inoculation substance are avoided.

2 Claims, 2 Drawing Figures

METHOD AND APPARATUS FOR INOCULATING CRYSTALLIZATION SEEDS INTO A LIQUID LATENT HEAT STORAGE SUBSTANCE

Prior Art

The invention relates to a method for inoculating or introducing crystal seeds into a liquid latent heat storage medium convertible to the solid state on cooling, and to an apparatus for carrying out the method.

In liquid latent heat storage media of the type convertible to the solid state on withdrawal of heat, it is essential that the withdrawl of heat crystal seeds be contained in the liquid to start the crystallization process. Without such crystal seeds, a strong undercooling of the latent heat storage liquid takes place in an undesirable way.

It is known to add inoculating substances to latent heat accumulators. They must be isomorphous with the storage medium. The lattice constant of the inoculation substance must be within a failure limit of a maximum of 15% (see Telkes, "Industrial and Engineering Chemistry", vol. 44, No. 6, pp. 1308–1310). Besides, the inoculation substances must not substantially dissolve in the latent heat storage medium or react with same. Finally, the melting temperature of the inoculation substances must be substantially above the operating temperature of the accumulator. Thus, a great number of requirements is to be met by the inoculation substances usually added to the heat storage medium, which cannot be fulfilled in many instances.

Moreover, the added inoculation substances also reduce the solidification temperature of the latent heat storage medium because crystal seeds act as impurities with respect to the latent heat storage medium.

The added inoculation substances can enter into reaction with impurities in the storage medium and can become partly or entirely lost or transformed, thus becoming ineffective. After a standstill period of the accumulator in a partly unloaded state, crystal seeds are present in residual liquid volume of the storage medium due to the stratification of same. As a rule, they cannot be again stirred so that a very substantial secondary undercooling takes place.

On these grounds, the addition of inoculation materials which should provide crystal seeds in the latent heat storage medium, is often undesirable and even impossible.

Summary of the Invention

It is an object of the present invention to provide a method for introducing of crystal seeds into a liquid latent heat storage medium which would not have the above disadvantages.

According to the present invention, a method is provided of the type described at the outset, wherein a part of the liquid latent heat storage medium is locally cooled on at least one active or cooling surface to a degree wherein the crystallization occurs on such surface, whereupon the formed crystals are released from the surface by reheating same to fuse-off the formed crystals.

Thus, by the method of the present invention, small crystals of the latent heat storage medium are formed automatically in the latent heat storage medium, the crystals being produced by local undercooling followed by reheating of the surface. These samll crystals disperse in free volumes of the liquid latent heat storage medium and thus form crystal seeds on which crystallization can take place. Since the crystal seeds are formed from the latent heat storage medium, the above described drawbacks of foreign inoculation substance do not arise.

If a heat exchange medium is passed, for the purpose of heat exchange, through the latent heat storage medium, and the heat exchange medium is immiscible with the latent heat storage medium and has a specific weight different from that of the storage medium, the heat exchange medium eventually settles in a stratum separate from the latent heat storage medium. In such systems, it is usual that an evaporator of a heat pump circulation is in heat exchange contact with the heat exchange medium. For this type of application, it is provided according to the invention that a cooling surface for the formation of crystals be brought into heat exchange contact with the heat pump circulation system flowing from expansion means, usually an expansion valve of the system. In order to release the formed crystals, the cooling surface is brought into heat exchange contact with at least a part of the heat carrier medium discharged from the compressor of the heat pump circulation system.

It is a further object of the present invention to provide an apparatus for introducing crystallization seeds into a liquid latent heat storage medium, which avoids the drawbacks noted above.

Thus, according to another general aspect of the invention, an apparatus is provided of the type described at the outset, wherein two sides of a Peltier element having reversible polarity each form a cooling surface or are each in heat contact with a cooling surface, both cooling surfaces being immersed in the liquid latent heat storage medium.

Depending on the instant polarity of the Peltier element, one of the two active surfaces of the same is cooled while the other is heated. By suitable selection of properties of the Peltier element or elements, it can be achieved that crystallization takes place on one of the two active surfaces, while the previously formed crystals are fused off the other active surface and discharged into the liquid. By switching the polarity of the Peltier element, the process can be periodically reversed in a simple manner, i.e. on the active surface on which crystallization took place before, the by now formed crystals are fused off while crystallization now takes place on the previously heated active surface.

It is suitable to arrange the active surfaces vertically so that the crystals formed on the cooling of the surfaces and then fused off the same can freely fall into the liquid part of the heat storage medium.

It is, of course, possible to use a plurality of the Peltier elements so that one structural unit contains a number of active surfaces on which crystallization and the fusing-off takes place in alternating fashion once the changeover of the electric current polarity is effected.

It is also possible to cool or heat the cooling surfaces otherwise. For instance, the heating can be effected by means of resistance heating. With storage substances whose conversion temperature is below the ambient temperature, the releae step can also be effected by utilizing ambient temperature. Conversely, with storage substances whose solidification temperature is above the ambient temperature, the possibility exists of crystal formation on the cooling surface by reducing the temperature to the ambient one. It is particularly advantageous in this connection to use so-called heat pipes as they possess increased heat conductivity.

Brief Description of the Drawing

The invention will now be described in greater detail with reference to the accompanying drawing.

In the drawing.

Detailed Description

Figure 1:
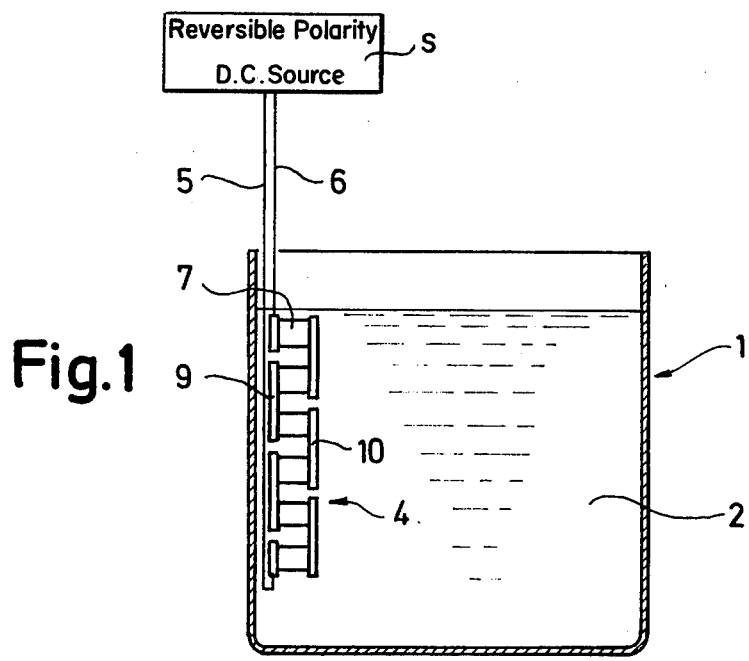
FIG. 1 is a diagrammatic side view of a latent heat accumulator with a device comprising a number of Peltier elements for the production of crystal seeds.

In FIG. 1 is shown a container 1 is filled with liquid latent heat storage medium 2, for instance with a solution of Glauber's salt or with water. Not shown in the drawing are means by which heat is delivered to the latent heat storage medium or by which heat is withdrawn from same. These can be provided, for instance, in a way known per se such that a liquid heat exchange medium immiscible with the latent heat storage medium is flown through the storage medium. Furthermore, it is also possible to arrange in the section filled with the latent heat storage medium a heat exchange pipe through which circulates a heat exchange medium.

According to the invention, a number of Peltier elements is disposed in the part of the container 1 filled with the latent heat storage medium. The peltier elements are assembled to form a Peltier elements block 4. In the block, a number of Peltier elements are disposed in series; the entire block is connected by two leads 5 and 6 with a source of direct currents having reversible polarity. As is well known, the Peltier elements each comprise shanks 7 made from a doped semiconductor material, wherein each respective n-doped semiconductor shank and a p-doped shank are mutually connected by a metallic bridge, for instance by a copper bridge, at their respective ends. The Peltier block 4 is comprised of a number of shanks 7 with reversible polarity, one beside the other, wherein each pair of adjacent shank is connected at one side by one copper bridge. Copper bridges at mutally opposite sides of the shank means are arranged in staggered fashion so that the current flows alternately through one copper bridge, a p-doped shank, another copper bridge, an n-doped shank, a further copper bridge, a p-doped shank, etc.

The copper bridges at the opposite sides of the Peltier block 4 thus form active surface 9 and 10. The block is preferably arranged such that the active surfaces are disposed vertically.

On a given polarization of the DC source, the active surfaces of one side of the block are heated while the active surfaces of the opposite side are cooled. The properties of the block are selected such that in the region of the cooled active surfaces undercooling takes place of such a magnitude that the surrounding portion of the latent heat storage medium solidifies on the cooled surface.

After a short time period, the switching of the polarization of the current flowing through the Peltier block results in the active surfaces of the other side now being cooled so that a portion of the latent heat storage medium solidifies on same. At the same time, the switchover results in that the surfaces on which latent heat storage medium had previously solidified, are now heated so that the solidified latent heat storage medium crystals are fused off and fall into the liquid latent heat storage medium in the container.

By alternating the switching of polarity of the DC source acting on the Peltier block, latent heat storage medium crystals are alternately formed on an fused off the respective active surface of the Peltier block. Thus, the Peltier block in effect produces crystal seeds of the latent heat storage medium and releases them into the liquid, so that on the produced seed crystals further crystallization can take place when heat is withdrawn from the latent heat storage medium.

Of course, the crystal seed formation can also be achieved when only one Peltier element is applied. However, the arrangement of the type of a block has the advantage that a number of active surfaces is obtained. In the described use of a Peltier element, no time delay is encountered due to the necessity of fusing off the crystals since during the period of fusing off the crystals from one active surface, solidification already takes place on the other active surface.

In each case, it is of advantage if the crystal formation begins by local undercooling at the time when the temperature of the latent heat storage medium is 0°–1° C. below the respective crystallization temperature of the latent heat storage medium. The crystal formation then takes place at conditions close to the equilibrium point so that very small crystals are obtained which can be well dispersed in the free volume of the latent heat storage medium. These small crystals are carried away by the motions of the liquid latent heat storage medium and can thus be distributed uniformly.

Figure 2:
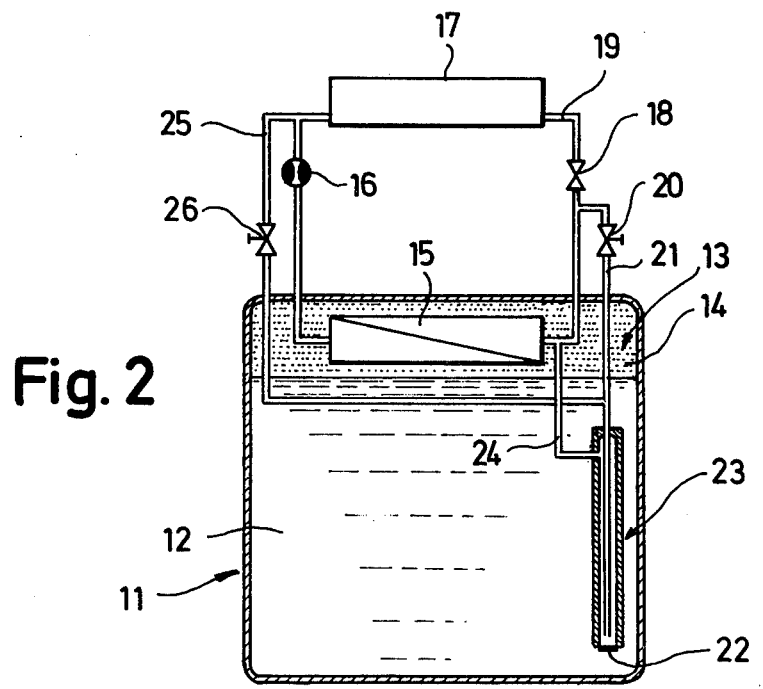
FIG. 2 is a diagrammatic view of a latent heat accumulator with a cooling finger which is arranged to be flown through by a heat carrier medium of a heat pump circulation.

In the exemplary embodiment shown in FIG. 2, an enclosed container 11 is involved in which a latent heat storage medium 12 is located. In order to deliver and withdraw heat, a heat exchange medium 13 is flown through the heat storage medium. The heat exchange medium is immiscible with the storage medium and has a different specific weight relative to same. The inlet and outlet of the heat exchange medium is not shown in the drawing. The heat exchange medium settles in a layer 14 above the liquid latent heat storage medium 12.

In the shown exemplary embodiment and evaporator 15 of a heat pump circulation is disposed within the layer 14, the circulation containing a compressor 16, a heat exchanger 17 as well as an expansion valve 18, all of said elements being interconnected by a tubing system 19. In this tubing system, a heat carrier medium is circulated as is well known from the art of heat pumps.

According to the invention, a pipe 21 branches off between the expansion valve 18 and the evaporator 15. The pipe 21 can be closed by means of a valve 20. The pipe 21 extends into the interior of a cooling finger 23 which is thermally insulated with the exception of its lower front face 22. Tfhe cooling finger 23 is disposed at least with its front face 22 in the liquid latent heat storage medium so that the heat carrier medium delivered into the cooling finger is maintained in heat contact with the latent heat storage medium.

From the cooling finger 23, the heat carrier medium flows through a further pipe 24 to the inlet of the evaporator 15.

A further pipe 25 in which is disposed a shut-off valve 26, communicates the discharge of the compressor 16 with the interior of the cooling finger 23 as well.

In operation of the system shown in FIG. 2, the heat pump circulation withdraws heat from the heat exchange medium 13 in the layer 14. The withdrawn heat is increased during the flow through the heat pump circulation in the known way and is again withdrawin by the heat exchanger 17. The heat carrier medium is eventually cooled down in the expansion valve 18 and again delivered to the evaporator 15.

By opening the valve 20, it is possible to deliver at least a part of the cooled heat carrier medium discharged from the expansion valve 18 into the interior of the cooling finger 23 so that the end face 22 is cooled. This results in a local cooling of the layer of the latent heat storage medium near the end face 22 and thus in solidification of same on the surface 22.

When the valve 20 is closed, the valve 26 in the conduit 25 is open, whereby the heat carrier medium discharged from the compressor 16 and having increased temperature is delivered into the cooling finger 23 so that the end surface 22 is now heated. This results in loosening or fusing off of the solidified latent heat storage medium to release it from the end surface 22 so that the solidified substance can fall into the liquid latent heat storage medium and serve there as an inoculation substance.

By alternating the opening of the valve 26 it is thus possible to periodically cool and briefly re-heat the active end surface 22 so that the solidification and fusing off can follow one after the other.

In both cases, the heat carrier medium enters after the passage through the cooling finger 23, over the piping 24 again into the inlet of the evaporator 15.

With the system shown in FIG. 2, it is possible to carry out the production of seed crystals without the requirement for an exterior source of energy for the cooling and heating of the cooling surfaces.

The active surfaces can also be preferably arranged in a vertical position and can be produced such that they form a part of the container jacket instead of being a part of a thermally insulated cooling finger.

Those skilled in the art will appreciate from the above description that further embodimets exist differing from the embodiments disclosed above without departing from the scope of the present invention as set forth in the accompanying claims.

We claim:

1. Apparatus for producing crystal seeds within a liquid latent heat storage medium (2) having a given crystallization temperature and which solidifies on cooling, comprising
   (a) container means (1) containing a given volume of said liquid latent heat storage medium;
   (b) at least one Peltier element (4) arranged within said container means and immersed in said liquid latent heat storage medium, said Peltier element including first and second crystallization surfaces (9, 10) of opposite polarity on opposite sides thereof; and
   (c) reversible polarity DC source means (S), including
      (1) first current means (5) connected with said Peltier element for supplying a first current of a given polarity to said crystallization surfaces for heating said first crystallization surface to a temperature above said crystallization temperature and for cooling said second crystallization surface to a temperature below said crystallization temperature to form crystal seeds thereon; and
      (2) second current means (6) connected with said Peltier element for supplying a second current of opposite polarity from said first current to said crystallization surfaces for cooling said first crystallization surface to a temperature below said crystallization temperature to form crystal seeds thereon and for heating said second crystallization surface to a temperature above said crystallization temperature to release crystal seeds therefrom, whereby alternate cooling and heating of said crystallization surfaces owing to said first and second currents of opposite polarity results in the continuous production and release of crystal seeds within said liquid latent heat storage medium.

2. Apparatus as defined in claim 1, wherein said crystallization surfaces are vertically arranged within said container, whereby upon release of said crystallization seeds, said seeds will fall freely within said liquid latent heat storage medium.

* * * * *